US010890758B1

(12) United States Patent
Curlander et al.

(10) Patent No.: US 10,890,758 B1
(45) Date of Patent: Jan. 12, 2021

(54) MOISTURE DEFLECTION APPARATUS FOR AERIAL VEHICLE CAMERAS

(71) Applicant: Amazon Technologies, Inc., Seattle, WA (US)

(72) Inventors: James Christopher Curlander, Bellevue, WA (US); Scott Raymond Harris, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 15/934,632

(22) Filed: Mar. 23, 2018

(51) Int. Cl.
*G02B 27/00* (2006.01)

(52) U.S. Cl.
CPC .... *G02B 27/0006* (2013.01); *B64C 2201/127* (2013.01)

(58) Field of Classification Search
CPC .............. G02B 27/0006; B64C 39/024; B64C 2201/027; B64C 2201/042; B64C 2201/104; B64C 2201/108; B64C 2201/127; B64D 47/08; G03B 15/006; H04N 5/2252; H04N 5/2257; H04N 5/23238; H04N 7/183

See application file for complete search history.

(56) References Cited

U.S. PATENT DOCUMENTS

| 5,873,256 A * | 2/1999 | Denniston | .......... B60H 1/00414 62/244 |
| 5,973,055 A * | 10/1999 | Michaud | .................. C09K 3/18 524/462 |
| 2012/0263445 A1 * | 10/2012 | Beasley | ............... G03B 15/006 396/12 |
| 2015/0256733 A1 * | 9/2015 | Kanamori | ............ H04N 5/2354 348/234 |
| 2017/0129312 A1 * | 5/2017 | Kato | ......................... B60H 1/34 |
| 2017/0352275 A1 * | 12/2017 | Maruyama | .............. B60R 1/003 |
| 2018/0201087 A1 * | 7/2018 | Soto | ................... B60H 1/00028 |
| 2018/0220889 A1 * | 8/2018 | Dirghangi | ................ A61B 3/15 |
| 2018/0308275 A1 * | 10/2018 | Fortmann | .......... G06K 9/00791 |

OTHER PUBLICATIONS

FlyingMAir, "Home to Airport, by Helicopter", Youtube video, https://www.youtube.com/watch?v=xIWQuAja2x4, accessed on Jan. 31, 2020. (Year: 2016).*

* cited by examiner

*Primary Examiner* — Wen Huang
(74) *Attorney, Agent, or Firm* — Athorus, PLLC

(57) ABSTRACT

This disclosure describes deflecting moisture out of the field of view of an imaging device during operation of an aerial vehicle, such as a UAV. The imaging device and/or a deflector positioned in the field of view of the imaging device is positioned within a path of a propulsion motor air disturbance. The deflector protects the lens from environmental conditions, such as moisture and rain and is positioned such that the force of the propulsion motor air disturbance moves any moisture, rain, or other debris contacting the surface of the deflector across the deflector surface and out of the field of view of the imaging device. As a result, distortion of image data generated by the imaging device as a result of water or moisture on the lens or in the field of view of the lens of the imaging device is reduced, if not eliminated.

20 Claims, 10 Drawing Sheets

MOISTURE DEFLECTION APPARATUS FOR AERIAL VEHICLE CAMERAS

BACKGROUND

As aerial vehicles, such as unmanned aerial vehicles ("UAV"), continue to become more popular, more and more of those vehicles include imaging devices, such as cameras. While the cameras work well for aerial photography, current systems are attempting to use image data from imaging devices for autonomous navigation, autonomous object detection and avoidance, etc. While some systems function well during certain weather conditions, existing autonomous systems become inoperable or unreliable during inclement weather. For example, during high humidity or rain, the lens of the imaging device collects moisture and/or rain drops and, as a result, the image data generated by the imaging device is distorted. The image processing algorithms receive the distorted image data and produce erratic results that make autonomous navigation and/or object detection and avoidance unreliable.

DETAILED DESCRIPTION

This disclosure describes systems, methods, and apparatus for deflecting moisture out of the field of view of an imaging device during operation of an aerial vehicle, such as a UAV. As described further below, the imaging device and/or a deflector positioned in the field of view of the imaging device is positioned within a path of a propeller propulsion motor air disturbance. The deflector protects the lens from environmental conditions, such as moisture and rain and is positioned such that the force of the propulsion motor air disturbance moves any moisture, rain, or other debris contacting the surface of the deflector across the deflector surface and out of the field of view of the imaging device. As a result, distortion of image data generated by the imaging device as a result of water or moisture on the lens or in the field of view of the lens of the imaging device is reduced, or eliminated.

In some implementations, the deflector may be positioned at an angle (i.e., diagonally) with respect to the path of the propulsion motor air disturbance so that the airflow of the propulsion motor air disturbance moves the moisture across the surface of the deflector and out of the field of view of the imaging device. Likewise, the imaging device may be calibrated to account for any reflection, refraction, etc., resultant from the deflector positioned in the field of view of the imaging device. As discussed further below, the angle, shape, and/or material of the deflector may vary.

In addition, one or more discharge channels may be positioned adjacent the deflector to receive the moisture as the moisture is moved off the surface of the deflector. The discharge channel receives the moisture and moves the moisture away from the deflector and expels the moisture away from the aerial vehicle. In some implementations, prior to expelling the moisture, the moisture may be routed through one or more cooling channels that pass across a surface of one or more components of the aerial vehicle, such as processors, electronic speed controls ("ESC"), etc., to provide liquid cooling to those components.

Figure 1:
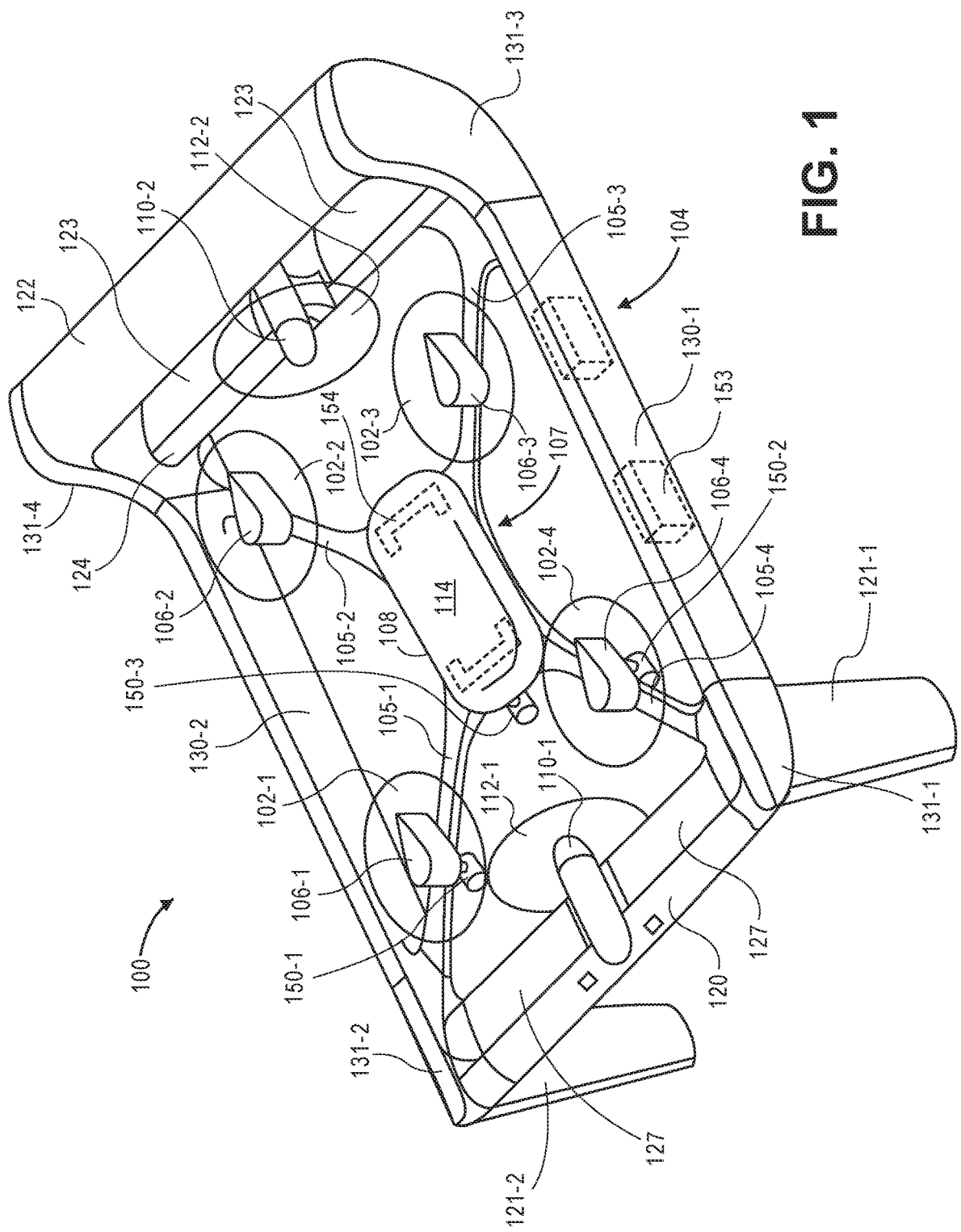
FIG. 1 depicts a view of an unmanned aerial vehicle configuration, according to an implementation.

FIG. 1 illustrates a view of an aerial vehicle, in this instance a UAV 100, according to an implementation. As illustrated, the UAV 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, and the rear right corner junction 131-4. In such an example, the corner junctions are also part of the perimeter frame 104.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the UAV 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component. For example, the wings may each have an airfoil shape that causes lift due to the airflow passing over the wings during horizontal flight.

Opposing ends of the front wing 120 may be coupled to a corner junction 131, such as the front left corner junction 131-1 and front right corner junction 131-2. In some implementations, the front wing may include one or more flaps 127 or ailerons, that may be used to adjust the pitch, yaw, and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction or hovering, the flaps 127 may be extended to increase the height of the protective barrier around a portion of the lifting propellers 102.

In some implementations, the front wing 120 may include two or more pairs of flaps 127, as illustrated in FIG. 1. In other implementations, for example if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons, that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1 or two or more pairs of flaps, respectively. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps or ailerons, that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the UAV 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the UAV 100 when the UAV 100 is moving in a direction that includes a horizontal component.

The winglets 121 and the rear corner junctions 131 may have dimensions that are proportional to the length, width, and height of the UAV 100 and may be positioned based on the approximate center of gravity of the UAV 100 to provide stability and control to the UAV 100 during horizontal flight. For example, in one implementation, the UAV 100 may be approximately 64.75 inches long from the front of the UAV 100 to the rear of the UAV 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the UAV, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the UAV 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. In some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102 that is rotated by the lifting motor to generate a lifting force and corresponding propulsion motor air disturbance. A "propulsion motor air disturbance," as used herein, is the air deflected by a propeller blade in motion, or another propulsion mechanism in operation, as part of the process of producing lift in a substantially vertical direction or thrust in a substantially horizontal direction. For clarity, propulsion motor air disturbance includes propeller propwash or downwash, jet engine jet wash, or any other air disturbance generated by a propulsion mechanism.

The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component through the generation of thrust in the substantially horizontal direction, and a corresponding propulsion motor air disturbance. For example, when the UAV 100 is traveling in a direction that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

Also coupled to the frame 104 is one or more imaging devices 150. As discussed further below, the imaging devices may be positioned beneath one or more of the lifting propellers 102 and in the path of at least a portion of the backwash from the propeller under which it is positioned. For example, imaging device 150-1 is positioned beneath propeller 102-1 and in the path of the backwash of the propeller 102-1 when the propeller is generating a lifting force. Imaging device 150-2 is positioned beneath propeller 102-4 and in the path of the backwash of the propeller 102-4 when the propeller is generating a lifting force. In addition, while the imaging devices 150 may be positioned beneath the lifting propellers, in other implementations, one or more of the imaging devices may be positioned in a path of at least a portion of the backwash of one or more of the thrusting propellers. For example, as illustrated in FIG. 1, imaging device 150-3 is coupled to the frame and in the path of at least a portion of the backwash from propeller 112-1 when propeller 112-1 is in operation.

As discussed further below, by positioning the imaging devices 150 in the path of at least a portion of the backwash of one or more propellers, moisture, such as rain or snow may be forced or moved out of the field of view of the imaging device from the force and airflow of the backwash, thereby enabling the imaging device to generate image data that is not distorted due to the moisture.

The perimeter frame 104 provides a surface upon which one or more components of the UAV 100 may be mounted. Alternatively, or in addition thereto, one or more components of the UAV may be mounted or positioned within the cavity of the portions of the perimeter frame 104. For example, one or more antennas may be mounted on or in the front wing 120. The antennas may be used to transmit and/or receive wireless communications. For example, the antennas may be utilized for Wi-Fi, satellite, near field communication ("NFC"), cellular communication, or any other form of wireless communication. Other components, such as imaging devices (e.g., cameras), time of flight sensors, accelerometers, inclinometers, distance-determining elements, gimbals, Global Positioning System (GPS) receiver/transmitter, radars, illumination elements, speakers, and/or any other component of the UAV 100 or the aerial vehicle control system (discussed below), etc., may likewise be mounted to or in the perimeter frame 104. As discussed herein, when the imaging device is mounted a location that is not in the direct path of a propulsion motor air disturbance from a propeller, an air channel may be utilized to route at least a portion of airflow from a propeller propulsion motor air disturbance to a location of the imaging device to move moisture off a deflector positioned in the field of view of the imaging device. Likewise, identification or reflective identifiers may be mounted to the perimeter frame 104 to aid in the identification of the UAV 100.

In some implementations, the perimeter frame 104 may also include a permeable material (e.g., mesh, screen) that extends over the top and/or lower surface of the perimeter frame 104 enclosing the central frame, lifting motors, and/or lifting propellers.

An aerial vehicle control system 114 is also mounted to the central frame 107. In this example, the aerial vehicle control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 100 includes one or more power modules 153. In some implementations, the power modules 153 may be positioned inside the cavity of the side rails 130-1, 130-2. In other implementations, the power modules may be mounted or positioned at other locations of the UAV. The power modules for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the aerial vehicle control system 114, the lifting motors 106, the thrusting motors 110, the imaging devices 150, and the payload engagement mechanism 154.

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

The UAV 100 may also include a payload engagement mechanism 154. The payload engagement mechanism 154 may be configured to engage and disengage items and/or containers that hold items (payload). In this example, the payload engagement mechanism 154 is positioned beneath and coupled to the hub 108 of the frame 104 of the UAV 100. The payload engagement mechanism 154 may be of any size sufficient to securely engage and disengage a payload. In other implementations, the payload engagement mechanism 154 may operate as the container that contains item(s). The payload engagement mechanism 154 communicates with (via wired or wireless communication) and is controlled by the aerial vehicle control system 114.

For purposes of illustration, in FIGS. 2 through 7B some components of an aerial vehicle have been omitted from the figures to facilitate discussion with respect to the disclosed implementations. However, it will be appreciated that the illustrated and described implementations are applicable to and may be included with any aerial vehicle, such as the aerial vehicle discussed above with respect to FIG. 1.

Figure 2:
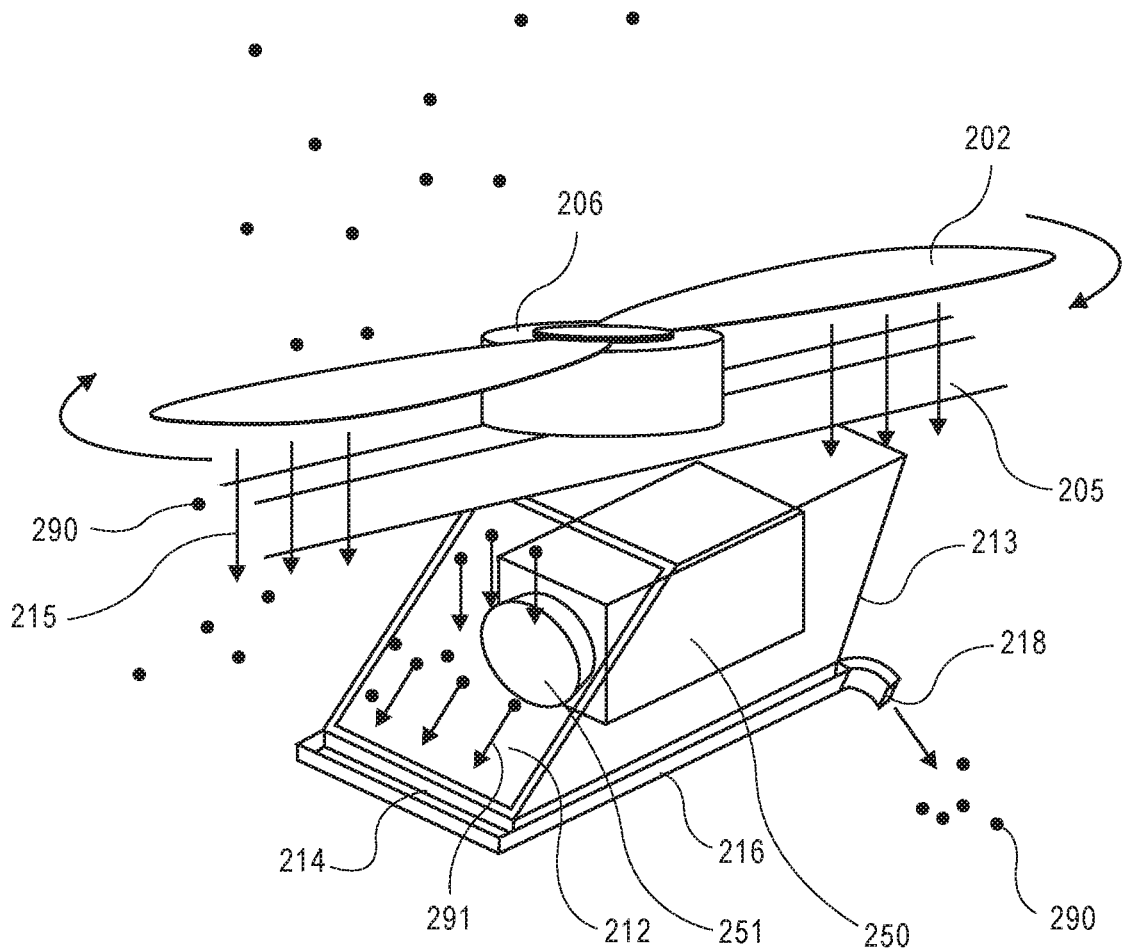
FIG. 2 depicts a view of an imaging device and a deflector positioned in the propulsion motor air disturbance of a propeller, in accordance with described implementations.

FIG. 2 depicts a view of an imaging device 250 and a deflector 212 positioned in the propulsion motor air disturbance of a propeller 202, in accordance with described implementations. In this example, the imaging device 250 is enclosed in a protective casing 213 that surrounds the imaging device 250 and protects the imaging device from weather, such as rain, snow, or other moisture 290. The deflector 212 forms the front of the protective casing 213 and is positioned in front of the imaging device 250 and in the field of view of the lens 251 of the imaging device 250. In this example, the imaging device is rigidly affixed to the protective casing 212 so that any vibrations of the imaging device 250 and/or the protective casing 213 are consistent. In other implementations, the protective casing may be eliminated and the deflector 212 mounted or affixed directly to the lens 251 of the imaging device 250 and the imaging device mounted to the motor arm 205.

In addition, the protective casing 213 that encloses the imaging device 250 is coupled to the motor arm 205 and beneath at least a portion of the path of the propulsion motor air disturbance 215 produced by the propeller 202 when rotated by the motor 206. In this example, the deflector is oriented at an angle (e.g., thirty-degrees, forty-five degrees) with respect to the path of the propulsion motor air disturbance 215 such that the lower portion of the deflector 212 that is farthest from the propeller extends forward, such that the surface of the deflector 212 is oriented at an angle toward the path of the propulsion motor air disturbance 215 of the propeller 202 during option. By positing the deflector 212 in the path of at least a portion of the propulsion motor air disturbance and orienting the deflector at an angle with respect to the path of the propulsion motor air disturbance, the force or airflow of the propulsion motor air disturbance across that contacts the surface of the deflector 212 will cause moisture (e.g., rain, snow) on the deflector 212 to move across the surface of the deflector and out of the field of view of the imaging device 250. In addition, by orienting the deflector at an angle improves the overall aerodynamics of the aerial vehicle when the aerial vehicle is navigating in a direction that includes a substantially horizontal component.

As illustrated by arrows 291, when moisture contacts the surface of the deflector 212, during operation of the propeller 202, the propulsion motor air disturbance 215 causes the moisture to move down the surface of the deflector 212 and out of the field of view of the imaging device 250. In this example, a discharge channel 214 is positioned adjacent the deflector 212. As the moisture is moved across the surface of the deflector and out of the field of view of the imaging device 250, the moisture moves off the deflector 212 and into the discharge channel 214. The discharge channel receives the moisture and channels the moisture away from the aerial vehicle. In the illustrated example, the discharge channel includes a column 216 that channels the received moisture toward the rear of the protective casing 213 and includes an opening 218, or exit, that allows the moisture 290 to exit and move away from the aerial vehicle. As discussed further below with respect to FIGS. 7A and 7B, in some implementations, the moisture may be routed through one or more cooling channels to provide liquid cooling to components of the aerial vehicle before the moisture is disposed of through an exit from the channels.

The material of the deflector 212 may be formed of any rigid, transparent material, such as glass, plastic, quartz, crystal, sapphire, etc. Likewise, in some implementations, the deflector may include or be coated with a hydrophobic coating and/or hydrophilic coating to assist in the movement of the moisture off the surface of the deflector and into the discharge channel. In still other examples, as illustrated below, the angle of the deflector with respect to the propulsion motor air disturbance may be any angle that will cause the propulsion motor air disturbance to move across the surface of the deflector, thereby moving or forcing the moisture off the surface of the deflector. Likewise, while the illustrated example shows the surface of the deflector being substantially flat, in other implementations, the surface of the deflector may be curved, include grooves to channel the moisture as it moves across the surface of the deflector, etc. Likewise, the imaging device may be calibrated to account for any distortion caused by the deflector.

By positioning the deflector in the field of view of the imaging device 250 such that the deflector will receive moisture and protect the lens 251 from the environment and/or weather, and by further positioning the deflector at an angle and in the path of a propulsion motor air disturbance of a propeller, will result in the moisture received by the collector being moved out of the field of view of the imaging device 250. Moving the moisture out of the field of view of the imaging device reduces or eliminates distortion of images caused by moisture being in the field of view or on the surface of the lens 251 of the imaging device 250. Reducing or eliminating distortion in the image data improves the quality of the image data and allows the image data to be used for autonomous navigation of the aerial vehicle, autonomous object detection and avoidance, etc.

Figure 3:
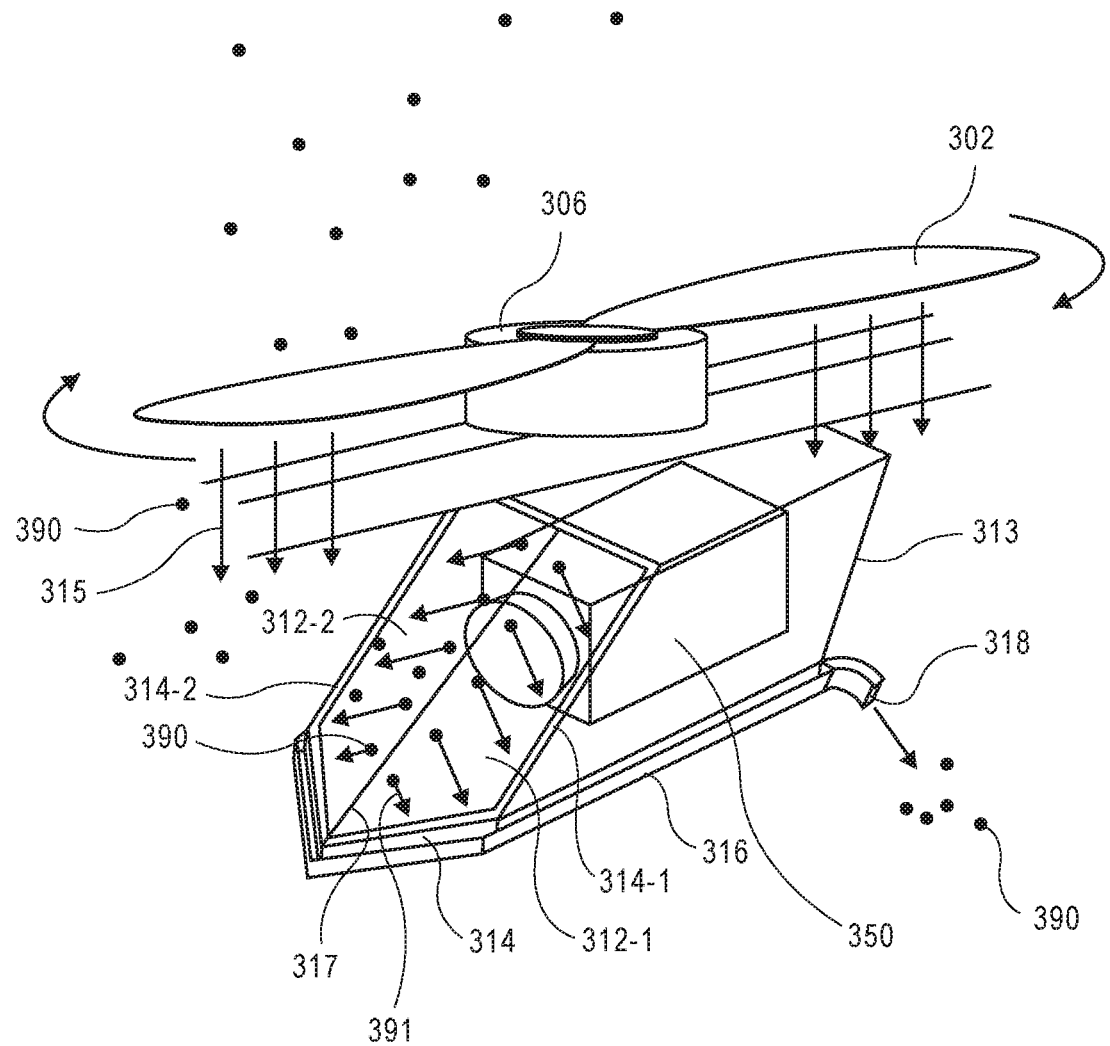
FIG. 3 depicts another view of an imaging device and a deflector positioned in the propulsion motor air disturbance of a propeller, in accordance with described implementations.

FIG. 3 depicts another view of an imaging device 350 and a deflector 312 positioned in the field of view of the imaging device 350 and in the propulsion motor air disturbance 315 of a propeller 302 produced when the propeller 302 is rotated by the motor 306, in accordance with described implementations. Similar to the example discussed with respect to FIG. 2, the deflector is part of a protective casing 313 that surrounds the imaging device to protect the imaging device from the weather and/or other environmental conditions. In this example, the deflector is positioned at an angle with respect to the path of the propulsion motor air disturbance 315, again so that the surface of the deflector is oriented toward the path of the propulsion motor air disturbance and the lower portion of the deflector extends forward. However, rather than the deflector having a substantially flat surface, the deflector includes two sections 312-1 and 312-2 that are peaked or angled outward toward a center of the deflector to form a crown 317 that extends vertically along the center of the deflector 312.

As illustrated by the arrows 391, when moisture contacts the surface of the deflector 312, during operation of the propeller 302, the propulsion motor air disturbance 315 causes the moisture to move down the surface of the deflector 312 and at an angle away from the crown 317, thereby moving the water out of the field of view of the imaging device 350. By angling the sections 312-1, 312-2 to form a crown 317, the moisture is moved a shorter distance toward the sides of the deflector, rather than down to the bottom of deflector as illustrated in FIG. 2, thereby decreasing the amount of time the moisture remains in the field of view of the imaging device and the distance the moisture is moved across the deflector before it exits the deflector 312 into a discharge channel 314.

In this example, the discharge channel 314 is positioned adjacent the deflector 312 and includes channels 314-1 and 314-2 that extend up the sides of the deflector 312 to receive moisture that is moved off the sides of the deflector by the propulsion motor air disturbance 315. As the moisture is moved across the surface of the deflector 312 and out of the field of view of the imaging device 350, the moisture moves into the discharge channels 314. The discharge channels 314 receive the moisture, and channel the moisture away from the aerial vehicle. In the illustrated example, the discharge channels include a column 316 that channels the received moisture toward the rear of the protective casing 313 and includes an opening 318, or exit, that allows the moisture 390 to exit and move away from the aerial vehicle.

Figure 4:
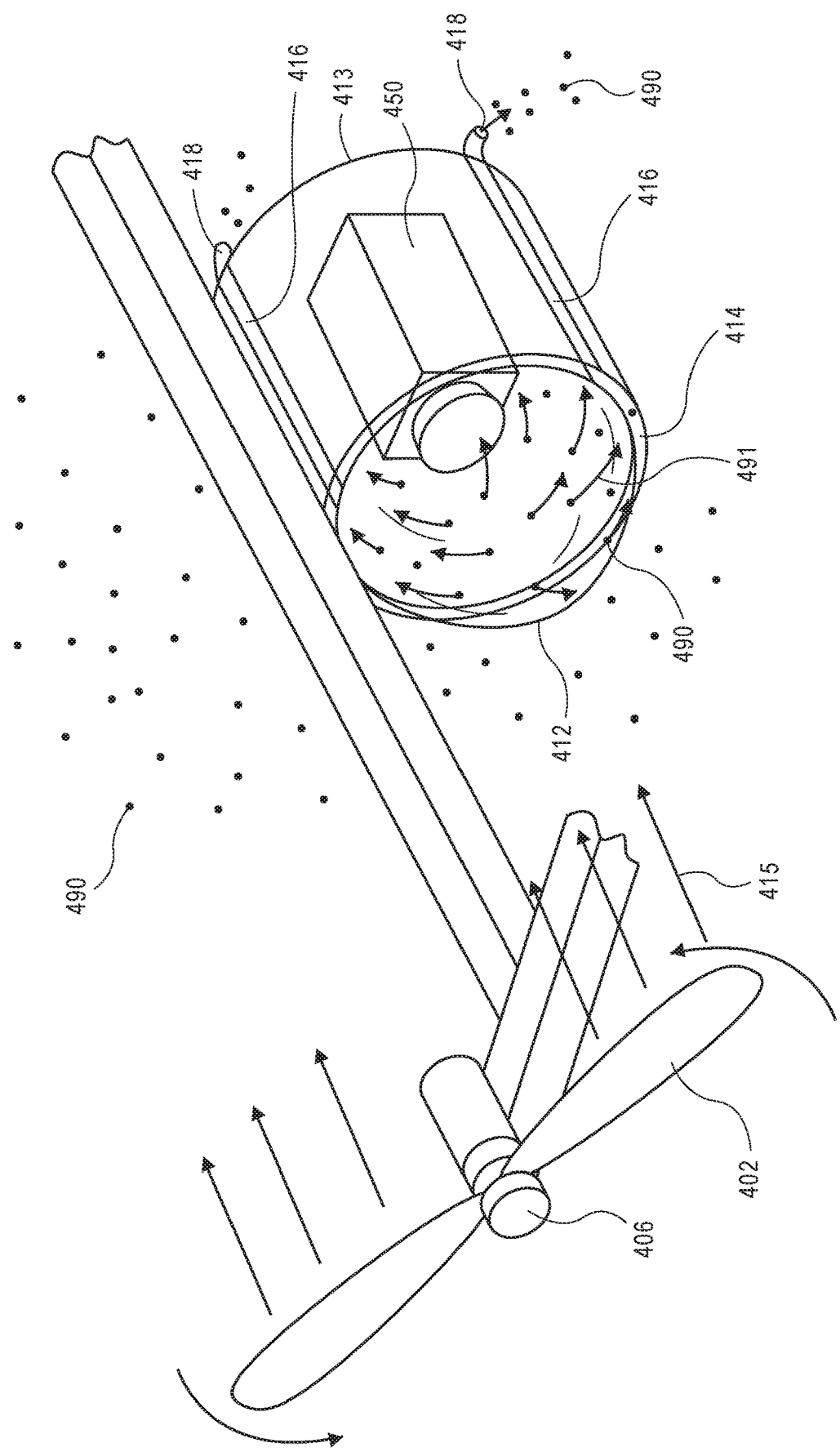
FIG. 4 depicts another view of an imaging device and a deflector positioned in the propulsion motor air disturbance of a propeller, in accordance with described implementations.

FIG. 4 depicts another view of an imaging device 450 and a deflector 412 positioned in the propulsion motor air disturbance 415 of a propeller 402 produced when the propeller 402 is rotated by the motor 406, in accordance with described implementations. In this example, the propeller 402 and motor 406 are a thrusting propulsion mechanism, such as the thrusting propeller 112-1 and thrusting motor 110-1 discussed above with respect to FIG. 1. As illustrated in FIG. 4, the propulsion motor air disturbance 415 of the thrusting propeller 402 moves in a horizontal direction toward the deflector and, in this example, the deflector has a substantially curved surface that has a convex curve that extends outward away from the imaging device 450 and toward the propeller 402.

Similar to the example discussed with respect to FIGS. 2 and 3, the deflector 412 is part of a protective casing 413 that surrounds the imaging device to protect the imaging device from the weather and/or other environmental conditions. In this example, because the deflector is curved and substantially circular, when moisture contacts the surface of the deflector 412, during operation of the propeller 402, the propulsion motor air disturbance 415 causes the moisture 490 to move along the curved surface of the deflector 412, toward the edges of the deflector 412, thereby moving the water out of the field of view of the imaging device 450, as illustrated by arrows 491.

In this example, the discharge channel 414 is positioned around the perimeter or edges of the deflector 412 to receive moisture that is moved off the surface of the deflector by the propulsion motor air disturbance 415. As the moisture is moved across the surface of the deflector 412 and out of the field of view of the imaging device 450, the moisture moves into the discharge channels 414. The discharge channels 414 receive the moisture, and channel the moisture away from the aerial vehicle. In the illustrated example, the discharge channels include columns 416 that channel the received moisture toward the rear of the protective casing 413 and each column 416 includes an opening 418, or exit, that allows the moisture 490 to exit and move away from the aerial vehicle.

Figure 5:
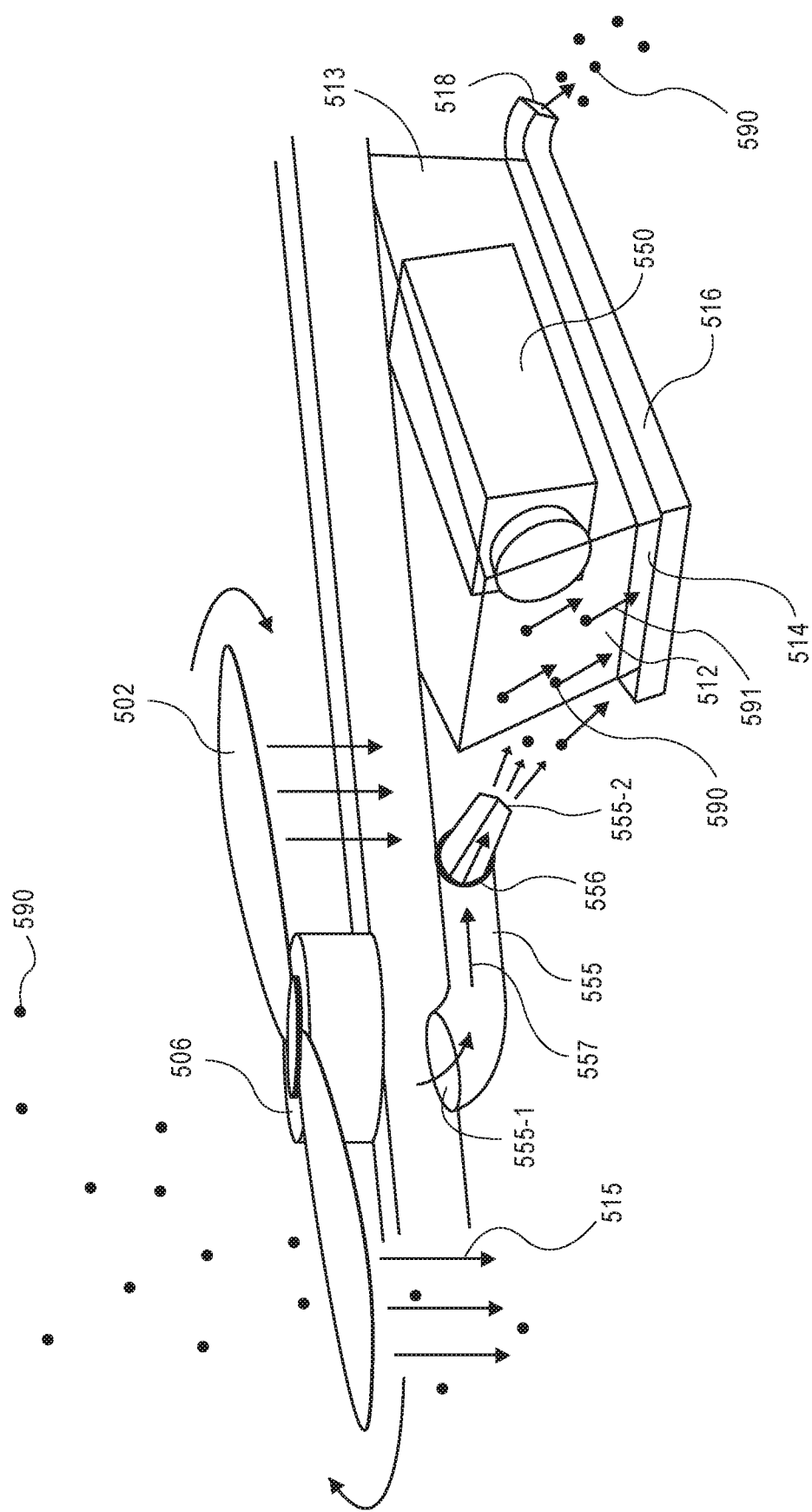
FIG. 5 depicts a view of an air channel positioned with one opening in the propulsion motor air disturbance of a propeller and a second opening directed toward a deflector and imaging device, in accordance with described implementations.

FIG. 5 depicts a view of an air channel 555 positioned with one opening in the propulsion motor air disturbance 515 of a propeller 502 and a second opening directed toward a deflector and imaging device, in accordance with described implementations. Like the example discussed with respect to FIGS. 2, 3, and 4, the deflector 512 is part of a protective casing 513 that surrounds the imaging device to protect the imaging device 550 from the weather and/or other environmental conditions. In this example, rather than positioning the deflector in the path of the propulsion motor air disturbance from the propeller 502 that is generated when the propeller 502 is rotated by the motor 506, included is an air channel 555 that routes at least a portion of the propulsion motor air disturbance toward the deflector. The air channel 555 includes a first opening 555-1 at a first end that is positioned beneath the propeller 502 and oriented to receive airflow of the propeller propulsion motor air disturbance 515. As illustrated by arrows 557, the collected propulsion motor air disturbance follows a path through the air channel 555 and exits a second opening 555-2 at a second end of the air channel that is oriented so that the propulsion motor air disturbance that follows a path through the air channel is directed toward the deflector 512. As with the other example, the propulsion motor air disturbance that impacts or moves across the deflector 512 causes the moisture 590 on the surface of the 512 to move across and off the surface of the deflector, as illustrated by arrows 591, thereby clearing the field of view of the imaging element 550 so that images are not distorted from the moisture.

In this example, for illustration purposes, the angle of the deflector is opposite that of the example discussed with respect to FIG. 2 in that the lower edge of the deflector is angled backward. As will be appreciated, like the other implementations, the deflector 512 may have any shape and/or angle and the one illustrated is provided only as an example.

Like the other examples, the discharge channel 514 is positioned adjacent the deflector 512 to receive moisture that is moved off the surface of the deflector by the propulsion motor air disturbance. As the moisture is moved across the surface of the deflector 512 and out of the field of view of the imaging device 550, the moisture moves into the discharge channels 514. The discharge channels 514 receive the moisture, and channel the moisture away from the aerial vehicle. In the illustrated example, the discharge channels include a column 516 that channels the received moisture toward the rear of the protective casing 513 and the column includes an opening 518, or exit, that allows the moisture 590 to exit and move away from the aerial vehicle.

Returning to the air channel 555, in some implementations, the air channel may include a pivot point 556 that may be used to adjust the position or orientation of the second opening 555-2, thereby altering the direction or flow of the propulsion motor air disturbance that follows the path through the air channel 555 and out the second opening 555-2. In some implementations, the pivot point may be controlled by a motor, such as a servo motor that oscillates or moves the second opening 555-2 so that the direction of the propulsion motor air disturbance moving across the deflector changes.

Figure 6:
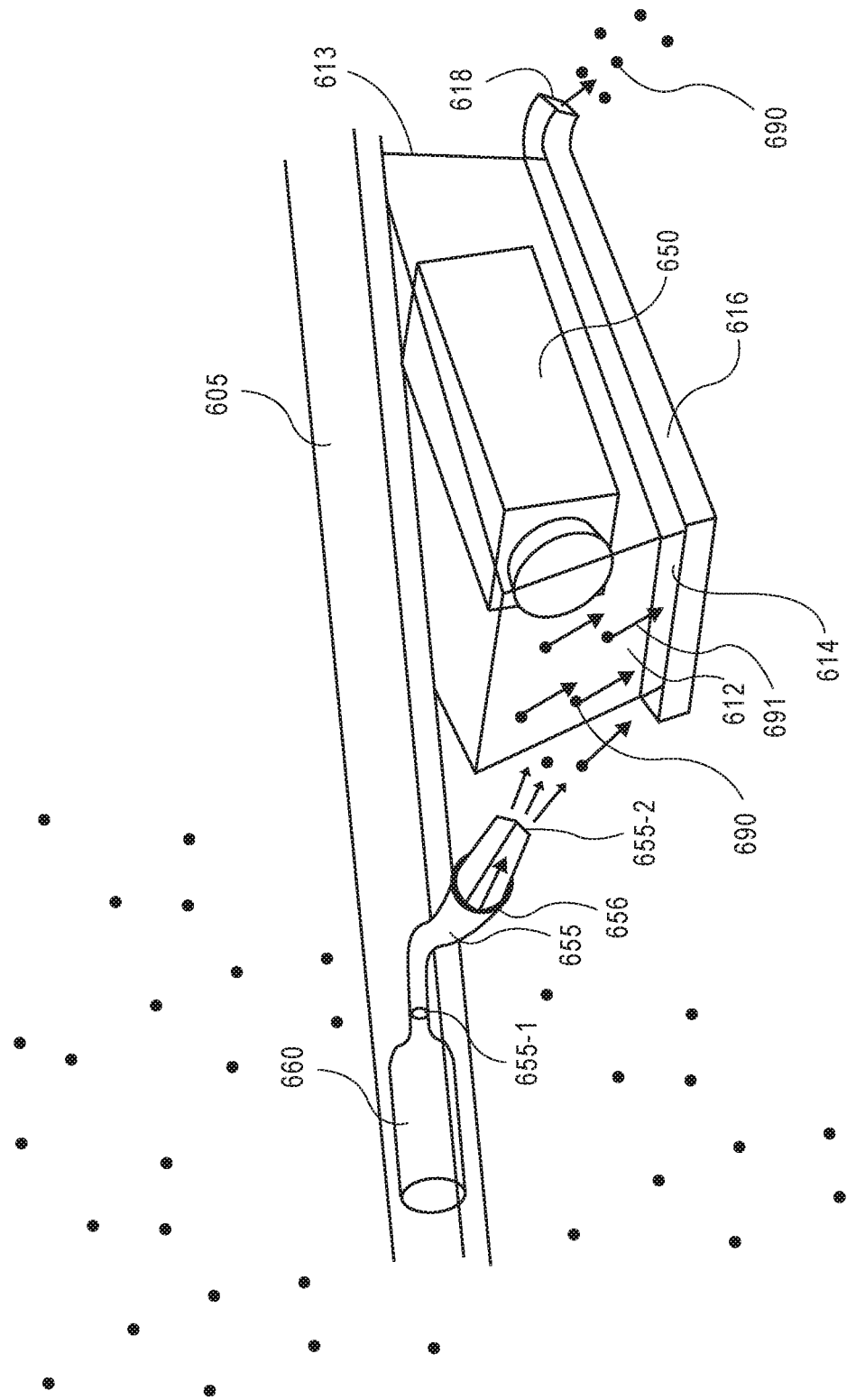
FIG. 6 depicts a view of an air channel positioned with one opening coupled to a gas cannister and a second opening directed toward a deflector and imaging device, in accordance with described implementations.

FIG. 6 depicts a view of an air channel 655 positioned with a first opening 655-1 at a first end coupled to a gas cannister 660 and a second opening 655-2 at a second end of the air channel 655 directed toward a deflector 612 that protects an imaging device 650 from the weather or other environmental conditions, in accordance with described implementations. The air channel 655, protective enclosure 613, deflector 612, etc., of FIG. 6 corresponds to like components of FIG. 5. However, in this example, rather than the first opening 655-1 at the first end oriented to collect propulsion motor air disturbance from a propeller, the first opening 655-1 is coupled to a gas cannister 660 that is housed, in this example, in a cavity of a motor arm 605 of the aerial vehicle. The gas cannister may contain any form of compressed gas, such as air, nitrogen, hydrogen, helium, etc. When the gas cannister is discharged, the discharged gas travels through the airflow channel 655 and out the opening on the second end 655-2 of the airflow channel 655.

As with the other examples, the gas expelled from the second opening 655-2 that impacts or moves across the deflector 612 causes the moisture 690 on the surface of the deflector 612 to move across and off the surface of the deflector, as illustrated by arrows 691, thereby clearing the field of view of the imaging element 650 so that images are not distorted from the moisture.

Like the other examples, the discharge channel 614 is positioned adjacent the deflector 612 to receive moisture that is moved off the surface of the deflector by the gas. As the moisture is moved across the surface of the deflector 612 and out of the field of view of the imaging device 650, the moisture moves into the discharge channels 614. The discharge channels 614 receive the moisture, and channel the moisture away from the aerial vehicle. In the illustrated example, the discharge channel includes a column 616 that channels the received moisture toward the rear of the protective casing 613 and the column includes an opening 618, or exit, that allows the moisture 690 to exit and move away from the aerial vehicle.

Returning to the air channel 655, in some implementations, the air channel may include a pivot point 656 that may be used to adjust the position or orientation of the second opening 655-2, thereby altering the direction or flow of the expelled gas that follows the path through the air channel 655. In some implementations, the pivot point may be controlled by a motor, such as a servo motor that oscillates or moves the second opening 655-2 so that the direction of the expelled gas moving across the deflector changes.

As mentioned above, in some implementations, the second end of the discharge channels may be coupled to one or more cooling channels that route collected moisture across one or more components of the aerial vehicle before the moisture is discharged. In other implementations, the cooling channels may be positioned to receive at least a portion of the propulsion motor air disturbance from one or more of the propellers of the aerial vehicle and direct the airflow of the received propulsion motor air disturbance across one or more components of the aerial vehicle to provide air cooling for those components.

Figure 7A:
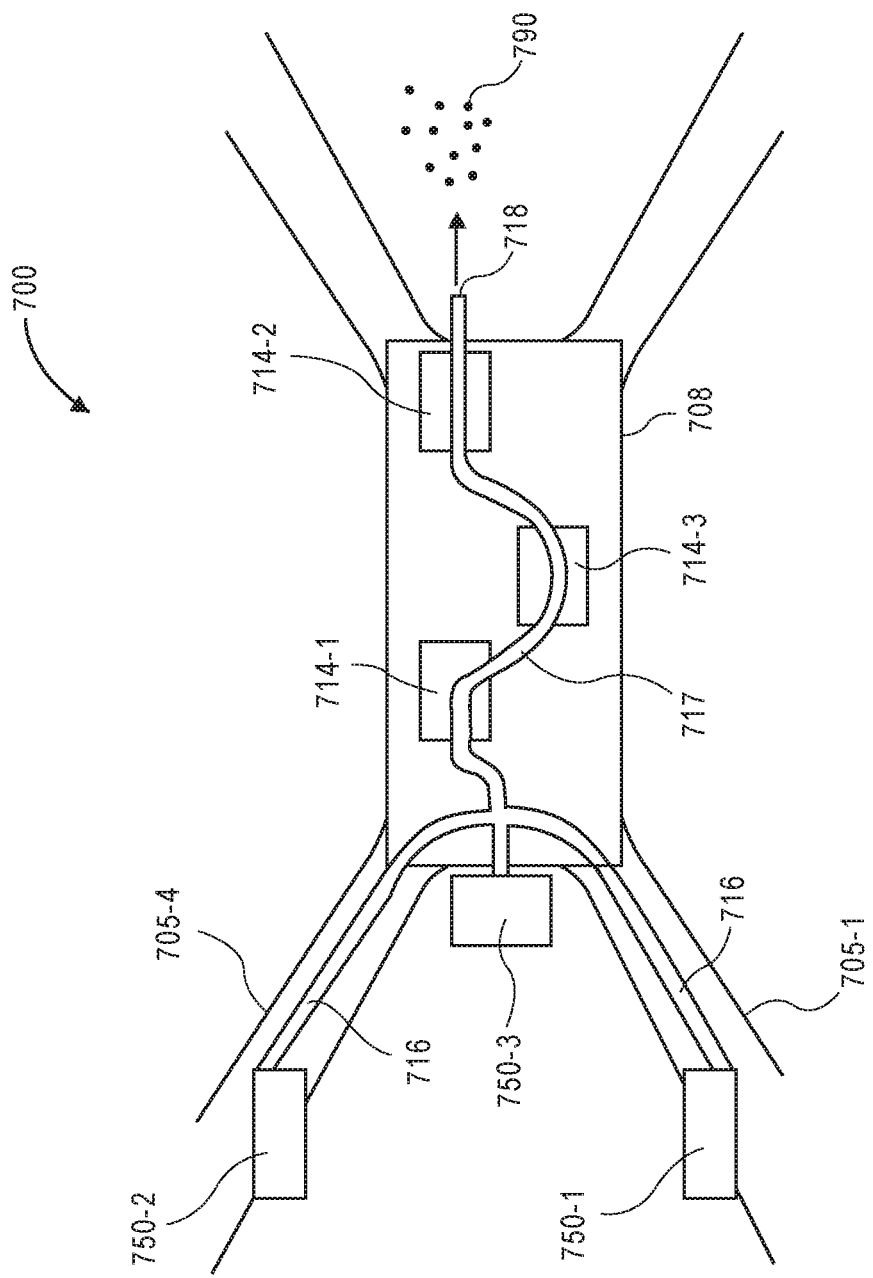
FIGS. 7A and 7B depict views of cooling channels positioned across components to providing cooling to those components, in accordance with described implementations.

FIG. 7A depicts a view of cooling channels 717 positioned across components 714-1, 714-2, 714-3 located at the hub 708 of an aerial vehicle 700 to provide cooling to those components, in accordance with described implementations. For discussion purposes, portions of the aerial vehicle 700 are omitted from the illustration in FIG. 7A. However, it will be appreciated, that the depiction illustrated in FIG. 7A may corresponds to any aerial vehicle, such as the aerial vehicle 100 discussed above with respect to FIG. 1. Components of the aerial vehicle may include any components of the aerial vehicle that may need cooling. Example components include, but are not limited to, ESCs, processors, navigation, power supplies, memory, network interface, etc. Example components of an aerial vehicle control system are discussed further below with respect to FIG. 10.

In the example illustrated in FIG. 7A, the cooling channel 717 is connected to the column 716 of the discharge channels discussed above so that the cooling channel receives the moisture from the column that is collected by the discharge channel. As moisture is collected by the discharge channels at each imaging device 750-1, 750-2, and 750-3 the moisture passes through the columns 716 that extend along each motor arm 705-1, 705-4, enters the cooling channel 717, moves through the cooling channel 717 and exits the opening 718 of the cooling channel so that the moisture 790 is expelled away from the aerial vehicle 700. As illustrated, the cooling channel passes over the surface of one or more components 714 and as the moisture passes through the cooling channel and across the components, the temperature of the moisture provides liquid cooling to the components 714.

Figure 7B:
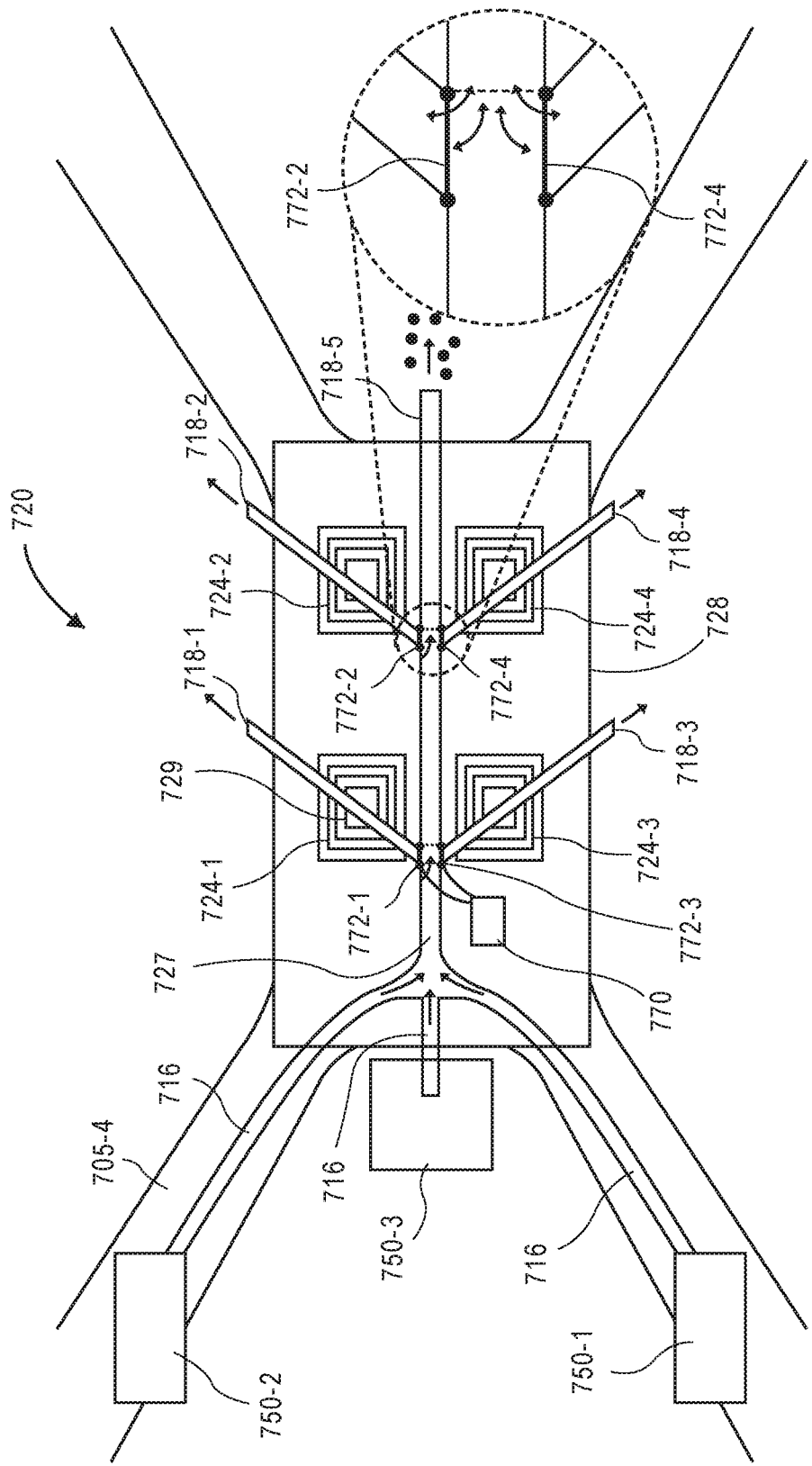

FIG. 7B depicts another view of cooling channels 727 positioned across components 724-1, 724-2, 724-3, and 724-4 located at the hub 728 of an aerial vehicle 720 to provide cooling to those components, in accordance with described implementations. As with FIG. 7A, for discussion purposes, portions of the aerial vehicle 720 are not illustrated in FIG. 7B.

In the example illustrated in FIG. 7B, rather than a single cooling channel that routes the received moisture across one or more components, in this example, the cooling channel 727 includes multiple paths 718-1, 718-2, 718-3, 718-4, and 718-5, one or more flow controls 772-1, 772-2, 772-3, and 772-4, and a cooling channel controller that controls the flow controls 772 to direct flow of the moisture through one or more of the paths. For example, the cooling channel controller 770 may monitor or receive temperature information for each of the components 724 and, based at least in part on the temperature information, send instructions to one or more of the flow controls to cause the flow controls to open or close and direct moisture to an appropriate component to provide liquid cooling to that component. For example, if it is determined that component 724-2 has reached a temperature that exceeds a threshold, the cooling channel controller 770 may send instructions to flow controls 772-1, 772-3, and 772-4 to close or block flow of moisture through paths 718-1, 718-3, and 718-4 and send instructions to flow control 772-2 to open or allow flow of moisture through path 718-2. As a result, moisture received from the discharge channels passes through the cooling channel 727 and path 718-2, which crosses the component 724-2, thereby providing liquid cooling to the component 724-2 before the moisture exits the opening of the cooling channel.

In some implementations rather than coupling the cooling channel to the discharge channel to receive moisture, in some implementations, the opening of the cooling channel may be positioned beneath a propeller and oriented to receive airflow from the propulsion motor air disturbance that results during operation of the propeller. In such an example, the propulsion motor air disturbance that enters the opening of the cooling channel will pass through the cooling channel and provide air cooling to components across which the cooling channels pass before exiting a second opening of the cooling channel. For example, either the cooling channel discussed above with respect to FIG. 7A, the cooling channel discussed with respect to FIG. 7B, and/or any other cooling channel configuration may utilize airflow from a propulsion motor air disturbance to provide cooling to one or more components rather than receiving moisture from one or more discharge channels. In a configuration where the cooling channels are providing air cooling using airflow from propeller propulsion motor air disturbance, the operation of the cooling channel and optionally the cooling channel controller and/or flow controls remains unchanged.

In still another implementation, the cooling channel may be configured to receive gas, such as air, nitrogen, hydrogen, helium, etc. from a compressed gas cannister and provide air cooling to one or more components as the discharged gas passes through the cooling channels and across the components.

As will be appreciated, any variety of configuration of the cooling channels may be utilized to distribute cooling, whether liquid cooling or air cooling, across surfaces of the one or more components. For example, the cooling channels may have a number of fins 729 or columns that are adhered to the surface of each component and when the gas or liquid (generally referred to herein as a cooling medium) reaches those fins or columns at a component, the cooling medium is dispersed across the fins or columns to provide even cooling along the surface of the component 724. At an opposing end, the cooling medium is recollected into the path of the cooling channel and eventually exits and is dispelled away from the aerial vehicle.

The flow controls may be any type of valve or control that can restrict or enable the flow of moisture or air through the cooling channels. For example, the flow controls may be gate valves, ball vales, etc.

Figure 8:
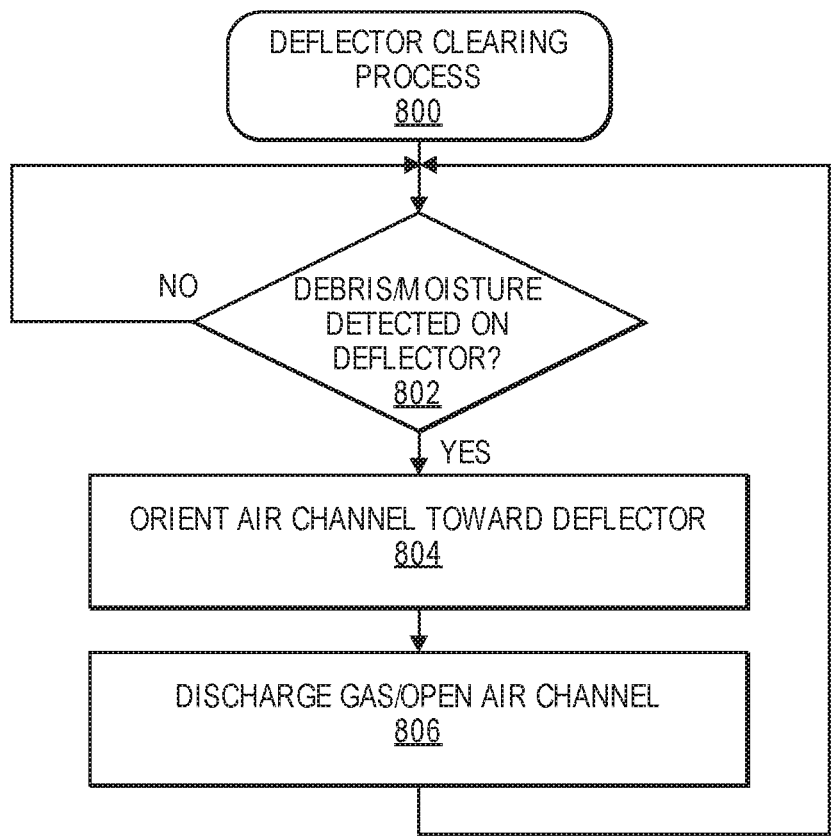
FIG. 8 is a flow diagram of an example deflector clearing process, in accordance with described implementations.

FIG. 8 is a flow diagram of an example deflector clearing process 800, in accordance with described implementations. The deflector clearing process 800 may be performed during any operation of the aerial vehicle. Alternatively, the example process 800 may only be performed during high moisture periods and/or when it is determined that there is debris or moisture detected on the deflector. Likewise, the example process relates to the operation of the example implementations discussed with respect to FIGS. 5 and 6 in which there is a column that is operable to direct propulsion motor air disturbance and/or compressed gas toward the deflector.

The example process 800 begins by determining whether debris or moisture is detected on the deflector, as in 802. If it is determined that there is no debris or moisture on the deflector, the example process 800 returns to block 802 and continues. However, if it is determined that there is debris or moisture on the deflector, the air channel is oriented toward the deflector, as in 804. In addition, if the air channel is not already on the open position, the air channel is opened to receive airflow from the propulsion motor air disturbance of a rotating propeller, as in 806. Alternatively, if the air channel is connected to as compress gas cannister, gas is discharged from the cannister.

After discharging the gas or allowing airflow from the propulsion motor air disturbance pass through the air channel, the example process 800 returns to block 802 and continues.

Figure 9:
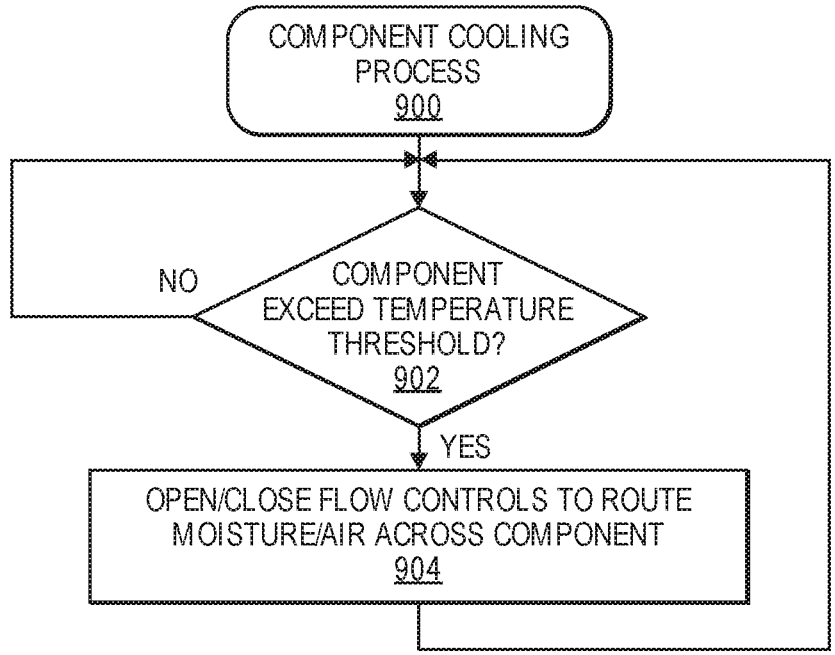
FIG. 9 is a flow diagram of an example component cooling process, in accordance with described implementations.

FIG. 9 is a flow diagram of an example component cooling process 900, in accordance with described implementations. The example process may be performed during operation of an aerial vehicle and relates to the example configuration discussed above with respect to FIG. 7B in which the cooling channel controller controls flow controls.

The example process 900 begins by determining if a component of the aerial vehicle exceeds a temperature threshold, as in 902. In some implementations, the example process may periodically receive temperature information from components of the aerial vehicle. The received or determined temperature information may be compared to a temperature threshold. The temperature threshold may be the same or different for different components of the aerial vehicle. In other implementations, the threshold may be a determination as to which component has the highest temperature and that component may be determined to exceed the temperature threshold.

If it is determined that none of the components of the aerial vehicle exceed a temperature threshold, the example process returns to block 902 and continues. If it is determined that a component does exceed the temperature threshold, the example process sends instructions that cause one or more flow controls to open or close, causing the air or water to follow a path that crosses the component determined to have a temperature that exceeds the threshold, as in 904. For example, as discussed above, the cooling channel controller, executing the example process 900 may send instructions to some of the flow controls to close one or more paths of the cooling channel and send instructions to another flow control to open a path that crosses the component so that the cooling medium, such as liquid or gas, will follow a path through the cooling channel that crosses the component, thereby providing cooling to the component. After routing the cooling medium along a desired path, the example process 900 returns to block 902 and continues.

Figure 10:
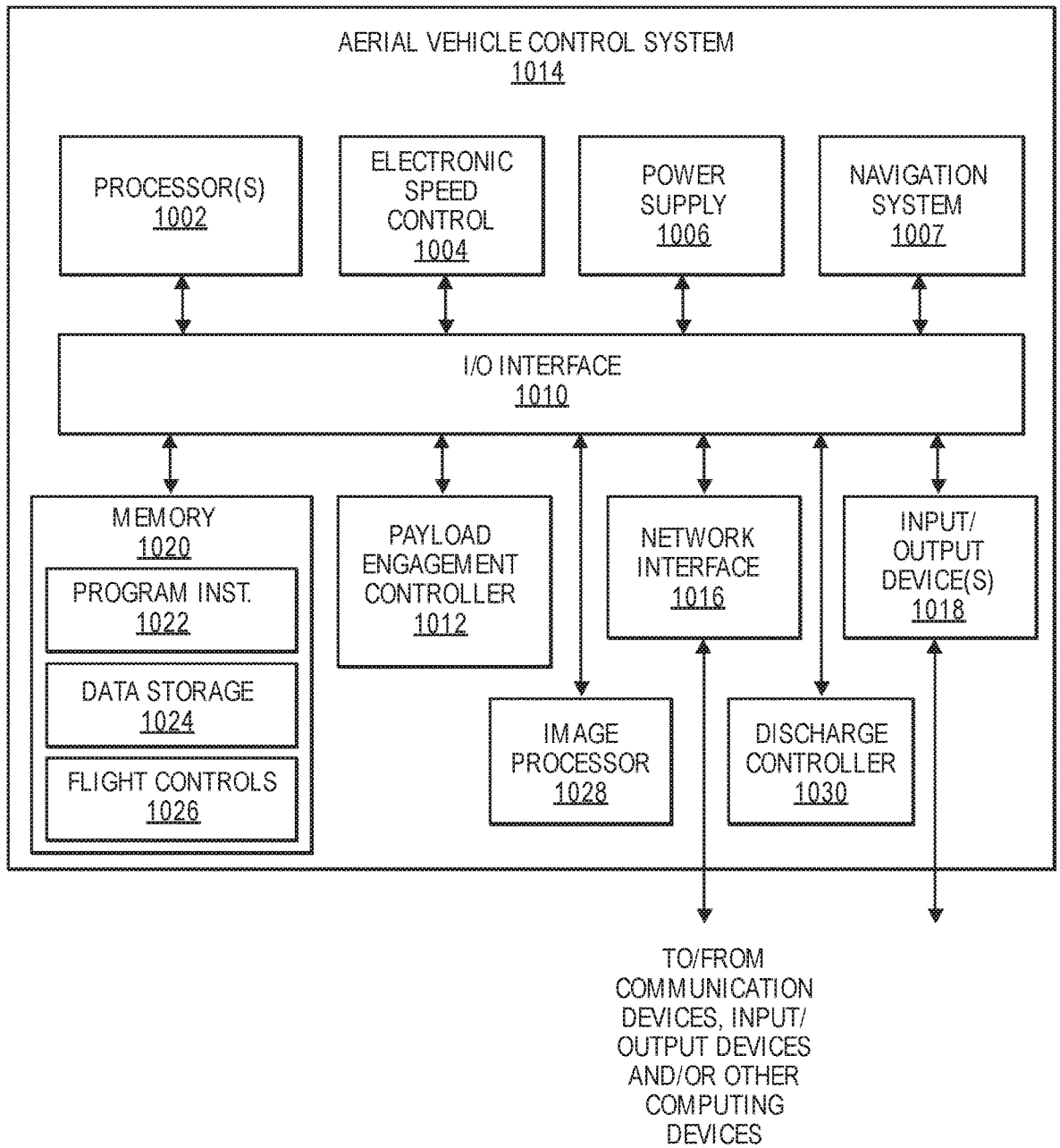
FIG. 10 is a block diagram of an illustrative implementation of an unmanned aerial vehicle control system that may be used with various implementations.

FIG. 10 is a block diagram illustrating an example aerial vehicle control system 1014. In various examples, the block diagram may be illustrative of one or more aspects of the aerial vehicle control system 114 that may be used to implement the various systems and methods discussed herein and/or to control operation of the aerial vehicles described herein. In the illustrated implementation, the aerial vehicle control system 1014 includes one or more processors 1002, coupled to a memory, e.g., a non-transitory computer readable storage medium 1020, via an input/output (I/O) interface 1010. The aerial vehicle control system 1014 may also include electronic speed controls 1004 (ESCs), power supply modules 1006, a navigation system 1007, a discharge controller 1030, and/or a payload engagement controller 1012. In some implementations, the navigation system 1007 may include an inertial measurement unit (IMU). The aerial vehicle control system 1014 may also include a network interface 1016, and one or more input/output devices 1018.

In some implementations, the cooling channel controller discussed above may also be included in the aerial vehicle control system 1014.

In various implementations, the aerial vehicle control system 1014 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, flight paths, flight control parameters, and/or data items accessible by the processor(s) 1002. Data items may include, for example, images obtained from one or more of the imaging devices, distance information, depth maps, etc.

In various implementations, the non-transitory computer readable storage medium 1020 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1020 as program instructions 1022, data storage 1024 and flight controls 1026, respectively. In other implementations, program instructions, data, and/or flight controls may be received, sent, or stored upon different types of computer-accessible media, such as non-transitory media, or on similar media separate from the non-transitory computer readable storage medium 1020 or the aerial vehicle control system 1014. Generally speaking, a non-transitory, computer readable storage medium may include storage media or memory media such as magnetic or optical media, e.g., disk or CD/DVD-ROM, coupled to the aerial vehicle control system 1014 via the I/O interface 1010. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface 1016 or other peripheral interfaces, such as input/output devices 1018. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The ESCs 1004 communicate with the navigation system 1007 and adjust the rotational speed of each lifting motor and/or the thrusting motor to stabilize the UAV and guide the UAV along a determined flight path. The navigation system 1007 may include a GPS, indoor positioning system (IPS), IMU or other similar systems and/or sensors that can be used to navigate the UAV 100 to and/or from a location. The payload engagement controller 1012 communicates with actuator(s) or motor(s) (e.g., a servo motor) used to engage and/or disengage items.

The network interface 1016 may be configured to allow data to be exchanged between the aerial vehicle control system 1014, other devices attached to a network, such as other computer systems (e.g., remote computing resources), and/or with aerial vehicle control systems of other UAVs. For example, the network interface 1016 may enable wireless communication between the UAV that includes the control system 1014 and an aerial vehicle control system that is implemented on one or more remote computing resources. For wireless communication, an antenna of a UAV or other communication components may be utilized. As another example, the network interface 1016 may enable wireless communication between numerous UAVs. In various implementations, the network interface 1016 may support communication via wireless general data networks, such as a Wi-Fi network. For example, the network interface 1016 may support communication via telecommunications networks, such as cellular communication networks, satellite networks, and the like.

Input/output devices 1018 may, in some implementations, include one or more displays, imaging devices, thermal sensors, infrared sensors, time of flight sensors, accelerometers, pressure sensors, weather sensors, imaging devices (e.g., cameras), gimbals, landing gear, etc. Multiple input/output devices 1018 may be present and controlled by the aerial vehicle control system 1014. One or more of these sensors may be utilized to assist in landing as well as to avoid obstacles during flight. In addition, one or more of the sensors may be used to detect moisture or debris on deflectors, as discussed above.

As shown in FIG. 10, the memory may include program instructions 1022, which may be configured to implement the example routines and/or sub-routines described herein. The data storage 1024 may include various data stores for maintaining data items that may be provided for determining flight paths, landing, identifying locations for disengaging items, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

The aerial vehicle control system 1014 may also include the image processor 1028. As discussed above, the image processor communicates with the plurality of imaging devices and receives digital images from the imaging devices that are protected by the deflectors. Likewise, as discussed, the imaging devices and/or the image process may be calibrated to account for any reflection of light, refraction of light, magnification, or other anomalies caused by the deflectors positioned in the field of view of the imaging devices, such as distortion caused by curved surface deflectors.

Those skilled in the art will appreciate that the aerial vehicle control system 1014 is merely illustrative and is not intended to limit the scope of the present disclosure. In particular, the computing system and devices may include any combination of hardware or software that can perform the indicated functions. The aerial vehicle control system 1014 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1014. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the aerial vehicle control system 1014 may be transmitted to the aerial vehicle control system 1014 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, capacities, attributes, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow charts of FIGS. 8 and 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. An aerial vehicle comprising:
 a frame;
 a motor coupled to the frame;
 a propeller coupled to the motor and rotatable by the motor to generate a lifting force and a propulsion motor air disturbance;
 a camera coupled to the frame and including a lens having a field of view;
 a deflector coupled to at least one of the frame or the camera and positioned:
  in front of the lens and in the field of view of the lens, such that at least a portion of the deflector is beneath the propeller and within at least a portion of a path of the propulsion motor air disturbance; and
  at an angle with respect to the path of the propulsion motor air disturbance;
 wherein:
  the deflector is configured to protect the lens and receive moisture; and
  the angle of the deflector and the propulsion motor air disturbance are configured to cause the moisture received by the deflector to move across the deflector and out of the field of view of the lens.

2. The aerial vehicle of claim 1, wherein the deflector is formed of a substantially rigid and substantially transparent material.

3. The aerial vehicle of claim 1, wherein:
 the deflector is coupled to the camera and the camera is calibrated to account for light refraction, light reflection, or magnification resultant from the deflector.

4. The aerial vehicle of claim 1, further comprising:
 a discharge channel positioned adjacent the deflector to receive the moisture as it is moved off the deflector by the propulsion motor air disturbance.

5. The aerial vehicle of claim 1, further comprising:
 at least one of a hydrophobic coating or a hydrophilic coating on at least a portion of the deflector.

6. A vehicle, comprising:
 a frame;
 a propulsion mechanism coupled to the frame and operable to generate a propulsion motor air disturbance;
 an imaging device coupled to the frame and including a field of view;
 a deflector coupled to at least one of the frame or the imaging device and positioned:
  in front of the imaging device and in the field of view, and
  such that at least a portion of the deflector is within a path of at least a portion of the propulsion motor air disturbance;
 wherein:
  the deflector is configured to protect the imaging device and receive moisture; and
  the position of the deflector and the propulsion motor air disturbance are configured to cause the moisture received by the deflector to move across the deflector and out of the field of view.

7. The vehicle of claim 6, wherein the deflector is positioned at an angle with respect to the path of the propulsion motor air disturbance.

8. The vehicle of claim 6, wherein the deflector is at least partially curved.

9. The vehicle of claim 6, further comprising:
 a discharge channel positioned adjacent at least a portion of the deflector to receive moisture as it is moved off the deflector by the propulsion motor air disturbance.

10. The vehicle of claim 6, further comprising:
 at least one component; and
 a cooling channel coupled to the discharge channel and further coupled to at least a portion of the component, wherein the cooling channel receives moisture from the discharge channel and passes the moisture across the at least a portion of the component to provide liquid cooling to the component.

11. The vehicle of claim 10, wherein the cooling channel includes an exit to discharge the moisture away from the vehicle after the moisture has passed across the at least a portion of the component.

12. The vehicle of claim 10, further comprising:
at least one flow control included in the cooling channel to control flow of the moisture between a first path of the cooling channel and a second path of the cooling channel; and
a cooling channel controller operably coupled to the flow control to control operation of the flow control.

13. The vehicle of claim 12, wherein the first path directs moisture across at least a portion of a first component of the at least one component and the second path directs moisture across at least a portion of a second component of the at least one component.

14. The vehicle of claim 6, further comprising:
an air channel coupled to the frame and having a first opening at a first end positioned within at least a portion of the propulsion motor air disturbance and a second opening at a second end oriented toward the deflector such that propulsion motor air disturbance is configured to enter the first opening, pass through the air channel, and exit the second opening.

15. The vehicle of claim 14, further comprising:
a pivot point located along the air channel and operable to adjust an orientation of the second end to alter a direction of the propulsion motor air disturbance with respect to the deflector as the propulsion motor air disturbance exits the second opening.

16. An apparatus, comprising:
a propulsion mechanism operable to generate a propulsion motor air disturbance;
an imaging device having a field of view;
a deflector positioned:
in front of the imaging device and in the field of view, and
such that at least a portion of the deflector is within a path of at least a portion of the propulsion motor air disturbance;
wherein:
the deflector is configured to protect the imaging device and receive moisture; and
the deflector and the propulsion motor air disturbance are configured to cause the moisture received by the deflector to move across the deflector and out of the field of view.

17. The apparatus of claim 16, further comprising:
a discharge channel positioned adjacent at least a portion of the deflector to receive moisture as the moisture is moved off the deflector by the propulsion motor air disturbance.

18. The apparatus of claim 16, further comprising:
a gas cannister; and
an air channel having a first end coupled to the gas cannister and a second opening at a second end oriented toward the deflector such that gas discharged from the gas cannister is configured to enter the first end, pass through the air channel, and exit the second opening and causes moisture received by the deflector to move off the deflector and out of the field of view.

19. The apparatus of claim 16, further comprising:
a gas cannister;
an air channel having a first end coupled to the gas cannister and a second end; and
a cooling channel having a first end coupled to the second end of the air channel, wherein the cooling channel receives gas from the air channel and passes the gas across the at least a portion of a component to provide cooling to the component.

20. The apparatus of claim 16, wherein the apparatus is an aerial vehicle.

* * * * *